(12) United States Patent
Gonzalez Davila et al.

(10) Patent No.: US 9,085,748 B2
(45) Date of Patent: Jul. 21, 2015

(54) STABILIZED PIPE SCALING REMOVER AND INHIBITOR COMPOUND

(75) Inventors: Vicente Gonzalez Davila, Madero (MX); Edgardo Jonathan Suarez Dominguez, Tampico (MX)

(73) Assignee: Geo Estratos, S.A. de C.V. (MX)

( * ) Notice: Subject to any disclaimer, the term of this patent is extended or adjusted under 35 U.S.C. 154(b) by 0 days.

(21) Appl. No.: 14/111,263

(22) PCT Filed: Apr. 3, 2012

(86) PCT No.: PCT/MX2012/000038
§ 371 (c)(1),
(2), (4) Date: Oct. 11, 2013

(87) PCT Pub. No.: WO2012/158009
PCT Pub. Date: Nov. 22, 2012

(65) Prior Publication Data
US 2014/0066351 A1    Mar. 6, 2014

(30) Foreign Application Priority Data
May 17, 2011 (MX) .................. MX/a/2011/005186

(51) Int. Cl.
*C11D 7/04* (2006.01)
*C11D 7/12* (2006.01)
(Continued)

(52) U.S. Cl.
CPC ............. *C11D 3/0073* (2013.01); *C02F 5/10* (2013.01); *C02F 5/105* (2013.01); *C09K 8/528* (2013.01);
(Continued)

(58) Field of Classification Search
CPC ...... C11D 3/04; C11D 3/2075; C11D 3/2079; C11D 3/2082; C11D 7/04; C11D 7/10; C11D 7/265

USPC ......... 510/247, 253, 255, 258, 269, 477, 488, 510/510, 511, 512
See application file for complete search history.

(56) References Cited

U.S. PATENT DOCUMENTS 4,220,550 A * 9/1980 Frenier et al. ................ 510/264
4,439,339 A * 3/1984 Doumit ........................ 510/100
(Continued)

FOREIGN PATENT DOCUMENTS

| CA | 2720382 | 10/2009 |
|---|---|---|
| CA | 2757709 | 12/2009 |
| CN | 101817597 A | 9/2010 |
| CN | 101864575 A | 10/2010 |
| EP | 2308956 A | 4/2011 |
| GB | 2419911 AB | 5/2006 |

*Primary Examiner* — Gregory R Delcotto
(74) *Attorney, Agent, or Firm* — Gunn, Lee & Cave. P.C.

(57) ABSTRACT

A chemical composition for eliminating and inhibiting formation of scaling in pipes caused by, for example, barium sulfate, calcium sulfate, calcium carbonate, magnesium carbonate, barium carbonate and ferric oxide. The chemical composition is comprised of a volume of an inorganic salt (0-12%), an organic monocarboxylic acid (0-45%), an organic di- or tricarboxylic acid (0-45%), an inorganic acid (0-15%), a salt derived from an organic carboxylic acid (0-15%), a corrosion inhibitor comprised of a mixture of amines or alcohols of high molecular weight (0-15%), and potable or sea water (0-92%). A biocide provides for gradual decomposition of precipitates without forming insoluble agglomerates. Elimination occurs through solubilization and dissolution of precipitates in an aqueous medium. Inhibition occurs through interference of anion-cation interactions of potential precipitation-forming ions preventing precipitate formation. The fluid produced has low corrosivity, benign to various polymeric materials, and ensures less damage and obstruction to pipes used during transport.

1 Claim, 2 Drawing Sheets

(51) Int. Cl.

| | | |
|---|---|---|
| *C11D 7/22* | (2006.01) | |
| *C11D 3/00* | (2006.01) | |
| *C11D 3/04* | (2006.01) | |
| *C11D 3/20* | (2006.01) | |
| *C02F 5/10* | (2006.01) | |
| *C09K 8/528* | (2006.01) | |
| *C11D 7/08* | (2006.01) | |
| *C11D 7/10* | (2006.01) | |
| *C11D 7/26* | (2006.01) | |
| *C09K 8/54* | (2006.01) | |
| *C02F 5/12* | (2006.01) | |
| *C02F 103/10* | (2006.01) | |

(52) U.S. Cl.
CPC ... *C09K 8/54* (2013.01); *C11D 3/04* (2013.01); *C11D 3/2075* (2013.01); *C11D 3/2079* (2013.01); *C11D 3/2082* (2013.01); *C11D 7/04* (2013.01); *C11D 7/08* (2013.01); *C11D 7/10* (2013.01); *C11D 7/265* (2013.01); *C02F 5/12* (2013.01); *C02F 2103/10* (2013.01); *C02F 2303/08* (2013.01)

(56) References Cited

U.S. PATENT DOCUMENTS

| | | | | |
|---|---|---|---|---|
| 5,468,303 | A * | 11/1995 | Thomas, Sr. | 510/184 |
| 6,127,330 | A * | 10/2000 | Bonett | 510/370 |
| 6,239,092 | B1 * | 5/2001 | Papasso et al. | 510/238 |
| 6,333,299 | B1 * | 12/2001 | Pace et al. | 510/238 |
| 6,551,985 | B1 * | 4/2003 | Bianchetti et al. | 510/475 |
| 2005/0215447 | A1 * | 9/2005 | Evers et al. | 510/238 |
| 2005/0215448 | A1 * | 9/2005 | Evers et al. | 510/238 |

* cited by examiner

STABILIZED PIPE SCALING REMOVER AND INHIBITOR COMPOUND

CROSS REFERENCE TO RELATED APPLICATIONS

This original non-provisional application claims priority to and the benefit of PCT Application Serial No. PCT/MX2012/000038, filed Apr. 3, 2012, entitled "Compuesto Estabilizado Eliminador e Inhibidor de Incrustaciones en Tuberías," claiming priority to Mexican Patent Application No. MX/a/2011/005186, filed May 17, 2011, and entitled "Compuesto Estabilizado Eliminador e Inhibidor de Incrustaciones en Tuberías," both of which are incorporated by reference herein.

INVENTION BACKGROUND

When an oil or gas well produces water (generally with a large content of dissolved salts), there is a possibility for scaling to form. This may also occur in deposits where water injection is used as an improved recovery system, or when using gas with high CO2 content and other contaminants. The most common scaling formed is barium sulfate or calcium carbonate.

Buildup of mineral sediments or incrustations may form in pipes both on the surface and in the bottom of the well, or even inside the porous medium in the formation of the oil deposit itself, which causes serious backup problems or even full blockages in pipes.

The techniques within the oil industry for eliminating scaling must be quick, not harmful with the formation and to the environment. Techniques using chemicals are the most common because they are the most economical. When scaling is formed by carbonates, hydrochloric acid (HCl) is the most widely used to dissolve and remove scaling, but this acid loses its effectiveness with the precipitated calcium sulfate or other incrustations, in addition to having special care for its use. Although there are methods used where a solvent is utilized together with washers containing normal or viscoelastic surfactants, these are very selective products, making it necessary for versatile formulations for different scaling types.

HCl, as mentioned before, is the most widely used chemical compound for eliminating this type of scaling due to its cost, but it is also the acid with the fastest reaction, and therefore, a fast depletion of its effect. As a result, this is the reason why formulations which react gradually are recommended as they have a greater reach within a formation.

The application of scaling treatment is varied according to the location, and goes from solely pumping the dissolving product in a duct or well to a mixture with organic and inorganic solvents and surfactant agents, by using flexible piping, capillary piping or in the same gas injection for pneumatic pumping. The most appropriate application is the most convenient in accordance with the problem at hand.

The chemical inhibition process involves the preferential absorption of the inhibitor molecules in these buildup locations. Consequently, the crystal will stop developing when the inhibitor molecules have occupied all these active zones Inhibitors act by controlling the scale deposits when they chemically interact with the crystal nucleation locations and substantially reduce their development rates by altering their surfaces. These are known as initiation inhibitors. They also act by sequestering the ions that precipitate and form scaling.

A scale inhibitor must satisfy several conditions in order to have a prolonged use. The following are among these conditions:

Be compatible (not to form reaction products with other system chemicals which causes its inactivation).

Be thermally stable (especially to the conditions in the bottom of the well) and hydrolytically stable for long terms.

Bacteriologically not sensitive.

Modify the size of crystals (form a tendency to disperse).

Delay or block the scaling precipitation process to a low concentration.

Must not promote emulsions.

Must be able to be monitored in the return fluids.

On the other hand, the inhibitor's maximum efficiency is threatened by:

Salinity and pH of the water that comes in contact with the inhibitor.

The water chemical composition, magnesium content and dissolved iron must be low.

Presence and type of suspended solids (the inhibitor is not yet "smart" and acts upon everything soluble traveling in the medium).

System temperature.

In order to obtain a successful inhibition, there must be a sufficient concentration of inhibitor molecules accompanying the fluid extracted from the well. This condition may be assured only if the inhibitor is held in the formation and gradually desorbed along with the produced fluid.

BRIEF DESCRIPTION OF THE DRAWINGS

The characteristic details of this new stabilized pipe scaling remover and inhibitor compound are clearly described in the description and figures below.

INVENTION DESCRIPTION

Figure 1:
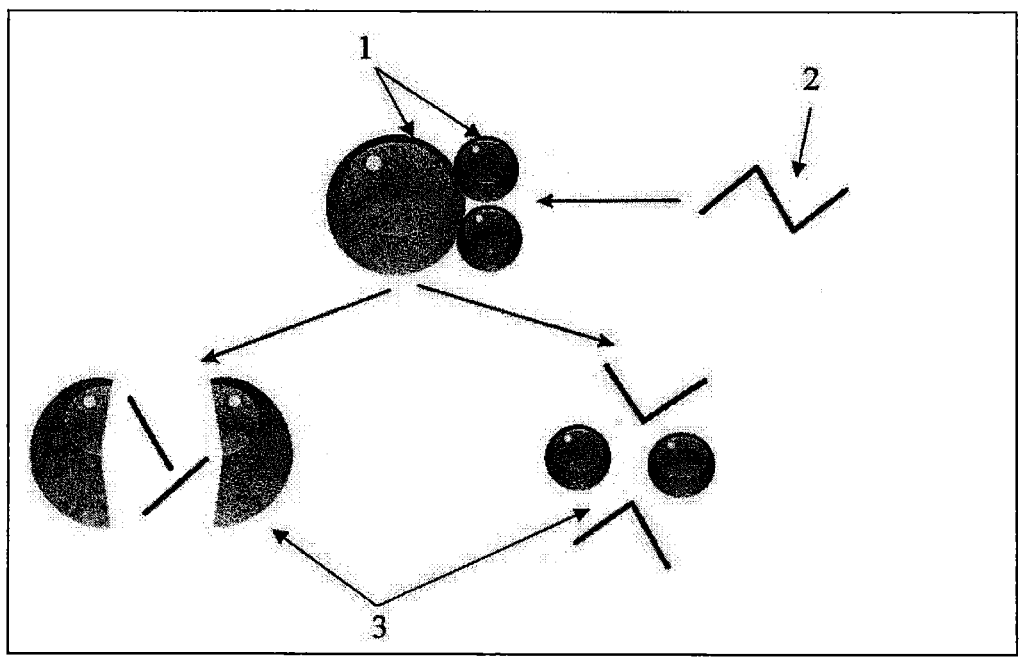
FIG. 1 depicts in an illustrative fashion the manner in which the compound of the present invention works in eliminating calcium carbonate scaling.

FIG. 1 depicts calcium carbonate formations (1) present in pipes. Natural water contains dissolved salts which differ in ion concentration and variety, where said calcium carbonate ($CaCO_3$) (1) is generally present in this type of water in its ionized form, formed by calcium ions ($Ca^{2+}$) and carbonate ions ($CO_3^{2-}$) produced from the reaction $Ca^{2+} + CO_3^{2-} \rightarrow CaCO_3$. Calcium carbonate (1) may precipitate from the solution due to causes such as:

Solution saturation by some of the ions.

Increase in temperature.

Carbonate ions may come from atmospheric $CO_2$ or from mixing with other gases, reacting with the $Ca^{2+}$ ions forming calcium carbonate (1) which precipitates. This way the reaction $CO_2 + H_2O \rightarrow CO_3^{2-} + 2H^+$ explains the formation of carbonic acid, which is possible in high pH; and although the latter is very unstable, the carbonates that get to form due to its presence end up being very stable, staying in the solution as long as the conditions are adequate.

The pH of the solution also has an influence on the solubility of the calcium carbonate because an acidic pH destroys the carbonate ions, causing the inverse reaction of ($CO_2$+ $H_2O \rightarrow CO_3^{2-} + 2H^+$). The presence of $CO_2$ increases the solubility of this salt.

Still referring to FIG. 1, upon adding a stabilized acid mixture (2), of the compound of the present invention to a fluid containing calcium carbonate formations (1), highly water soluble compounds (3) are obtained, eliminating the calcium carbonate precipitates (1).

Figure 2:
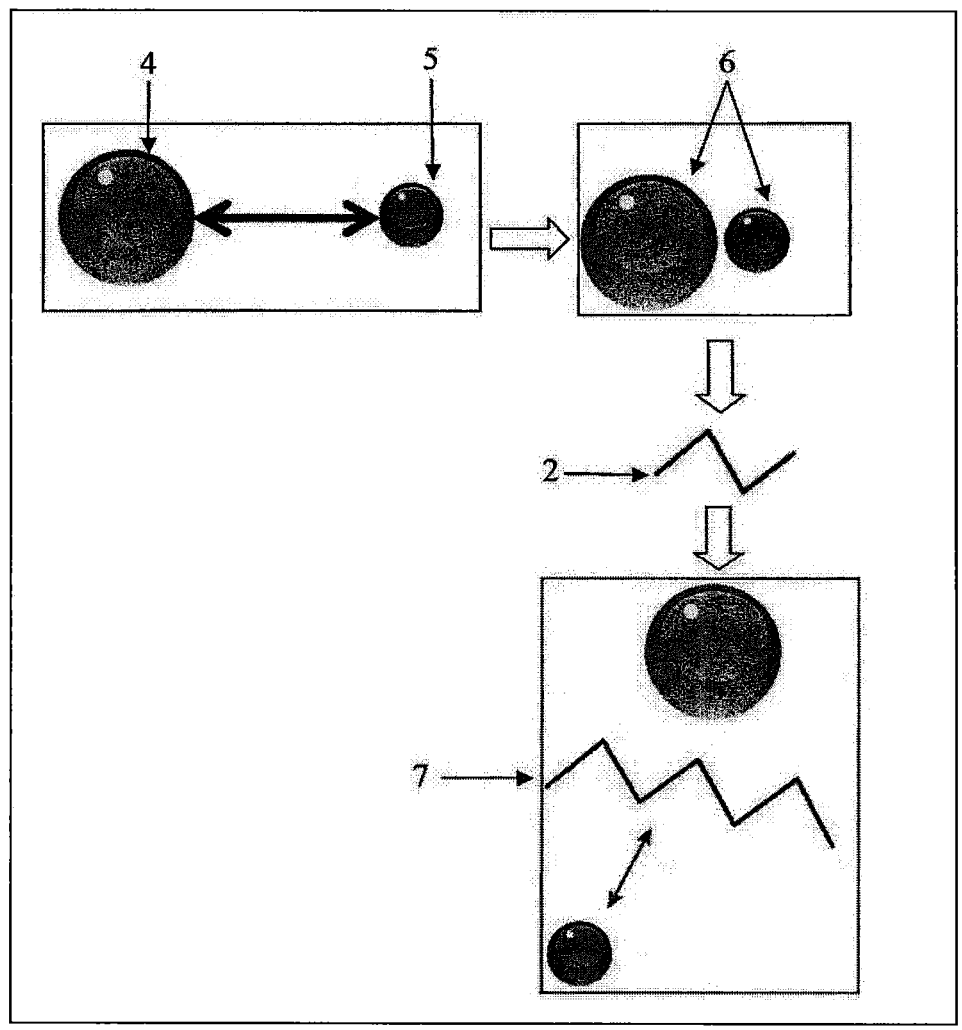
FIG. 2 depicts in an illustrative fashion the manner in which the compound of the present invention works in inhibiting scaling formation.

One can observe in FIG. 2 the manner in which the formation of scaling may be inhibited. The existing interaction between calcium ions (4) and carbonate ions (5) bring about the formation of calcium carbonate precipitate (6), but when adding the stabilizing compound (2) of the present invention to the fluid, the inhibition of precipitable anion-cation interaction is achieved (7).

The influence of the pH may be evaluated if the temperature and hardness of the water is known by the Langelier Saturation Index:

$$IL = pH - pH_s$$

where $pH_s$ is the pH calculated for a $Ca^{2+}$ concentration to arrive at the saturation. The Langelier Saturation Index is interpreted with the Stiff-Davis analysis: negative values indicate that there will not be precipitation; and, if on the contrary, the value ends up being positive, scaling water will result.

Another highly-precipitable ion is calcium sulfate which is generally present when finding dissolved sulfate ions and calcium ions, as follows:

$$Ca^{2+} + SO_4^{2-} \rightarrow CaSO_4$$

In addition to ferric oxide ($Fe_2O_3$), the reaction occurs due to the oxidation of iron according to:

$$Fe^{2+} \rightarrow Fe^{3+} + e^-$$

and $$O_2 + 4H^+ + 4e^- \rightarrow 2H_2O \text{ or } O_2 + 2H_2O + 4e^- \rightarrow 4OH^-$$

The compound of this invention has various formulations formed by the components described in Table 1.

TABLE 1

Formulation components of this invention's compound

| Percentage | Element Description |
|---|---|
| 0 to 12% | Inorganic Salt |
| 0 to 45% | Organic monocarboxylic acid |
| 0 to 45% | Organic di or tricarboxylic acid |
| 0 to 15% | Inorganic acid |
| 0 to 15% | Salt derived from an organic carboxylic acid |
| 0 to 15% | Corrosion inhibitor |
| 0 to 92% | Potable or sea water |

The organic monocarboxylic acid may be formic acid (HCOOH) or acetic acid (CH3COOH). The organic di or tricarboxylic acid is formed by any organic acid which contains two or three or more carbonyl groups bonded to a hydroxyl radical (—COOH) such as citric acid or oxalic acid. The inorganic acid refers to hydrochloric acid (HCl) or nitric acid (HNO3). The salt derived from an organic carboxylic acid is any one with the formula:

R—COO⁻⁺Me where R is any radical which may also contain one or more carboxyl groups and Me is any alkali metal or alkaline earth metal.

The corrosion inhibitor is composed of a mixture of amines or alcohols of a high molecular weight.

Scaling Formation Inhibition Experiments.
Formulation 1.

For the formulation 1 described in Table 2 a scaling formation inhibitor is shown with the components mentioned in Table 1:

TABLE 2

Formulation 1.

| Formulation 1 | CITRIC ACID |
|---|---|
| | SOLUTION AT 20% |
| | 10 NaCl |
| | 10% SODIUM CITRATE |
| | 2% NITRIC ACID |

Additionally, two highly-scaling solutions were prepared with different ion concentration in accordance with what is shown in Table 3.

TABLE 3

Concentration in milliequivalents/liter of cations and anions in synthetic water

| Name | Na+ | Ca++ | Mg++ | Fe++ | Cl− | HCO3− | SO4= | CO3− |
|---|---|---|---|---|---|---|---|---|
| Solution 1 | 934.47 | 122 | 127.48 | 1.86 | 1076.53 | 8.08 | 1 | 1.2 |
| Solution 2 | 3893.94 | 1472 | 671.66 | 46.9 | 5946.5 | 67 | 50 | 21 |

Mixtures were made with these two solutions prepared in Table 3 in different ratios as described in Table 4.

TABLE 4

Parts in the mixture of mixtures from Solution 1 and Solution 2

| Mixture | Solution 1 from Table 3 | Solution 2 from Table 3 |
|---|---|---|
| 1 | 10 | 90 |
| 2 | 25 | 75 |
| 3 | 50 | 50 |
| 4 | 75 | 25 |
| 5 | 90 | 10 |

Theoretical Analysis of Precipitates.

The theoretical precipitate was calculated for each mixture. The mixture of the two solutions which contain different concentrations of the same ion will give a final concentration of this ion, which is calculated as follows:

$$C_f = (x_A)(C_A) + (x_B)(C_B)$$

where $C_f$, X and C are the concentration of the ion in the final solution, the fractions of the solution taken in order to make the mixture, and the concentration of the ion in the corresponding solution, respectively.

The Langelier Stability Index was calculated in accordance with:

$$IS = pH - pH_s$$

where IS, pH, $pH_s$ are the stability index, pH of the solution and pH of the solution saturated with calcium carbonate, respectively.

The $pH_s$ parameter is calculated as follows:

$$pH_s = (9.3 + q_{SDT} + q_T) - (q_{CA}^{2+} + q_{Ak})$$

From where the following parameters stem out:

$$q_{SDT} = \frac{-1 + \log STD}{10}$$

$$q_T = (-13.12)(\log[T + 273]) + 34.55$$

$$q_{Ca}^{2+} = -0.4 + \log D$$

$$q_{Ak} = \log Ak$$

where SDT, T, D and Ak are the total dissolved solids in mg/L, the temperature in ° C., the calcium hardness as calcium carbonate in mg/L, and the total alkalinity as calcium carbonate in mg/L, respectively.

In order to calculate the solution pH, one must initially determine the concentration of the hydrogen ion in solution:

$$[H^+]_f = (x_A)([H^+]_A) + (x_B)([H^+]_B)$$

where $[H^+]_f$, X, $[H^+]$ are the final concentration of hydrogen ions in the mixture, the fractions of the solution taken in order to make the mixture, and the concentration of hydrogen ions in each solution (obtained with $[H^+] = 10^{-pH}$), respectively. The final pH of the solution will be given by:

$$pH = -\log [H^+]_f$$

Calcium sulfate milligrams are obtained by the following formula:

$$mg_{CaSO4} = 68(meq_{SO4})$$

where $meq_{CaSO4}$ = milliequivalents of sulfate ions.

Calcium carbonate milligrams are obtained by the following formula:

$$mg_{CaCO3} = 50(meq_{CO3})$$

where $meq_{CaCO3}$ = milliequivalents of carbonate ions.

Calcium carbonate milligrams due to bicarbonate ions are obtained by the following formula:

$$mg_{CaCO3} = 100(meq_{HCO3})$$

where $meq_{HCO3}$ = milliequivalents of bicarbonate ions.

Maximum ferric oxide milligrams produced are:

$$mg_{Fe2O3} = 1.43(mg_{Fe2})$$

where $mg_{Fe2}$ = milligrams of iron ions present.

Experimental Analysis of Precipitates.

Mixtures were carried out in the laboratory, at room temperature, in order to determine the actual solids obtained per mixture according to Table 3.

Table 5 shows the theoretical results of precipitates obtained from the formulas shown above. I.E. means Stability Index.

Table 6 shows the results of precipitations where the mixtures were left to rest for 24 hours and were then subjected to a centrifuge. The experiment was repeated on Table 7 with a dosage of 1000 ppm of Formulation 1 showing results with precipitates.

TABLE 5

Theoretical results of possible precipitates in the mixture of Solution 1 with Solution 2 in different ratios by applying formulas

| Composition | Temp (° C.) | I.E. | Theoretical CaSO4 (mg/L) | Theoretical CaCO3 (mg/L) | Theoretical Fe2O3 (mg/L) | Theoretical CaCO3 by Ca(HCO3)2 (mg/L) | Pp (mg/L) |
|---|---|---|---|---|---|---|---|
| 10% Sol1 + 90% Sol2 | 25 | 2.19 | 3,067 | 951 | 1,773 | 12,222 | 18,012 |
| 25% Sol1 + 75% Sol2 | 25 | 1.68 | 2,567 | 803 | 1,490 | 10,454 | 15,314 |
| 50% Sol1 + 50% Sol2 | 25 | 1.12 | 1,734 | 555 | 1,020 | 7,508 | 10,817 |
| 75% Sol1 + 25% Sol2 | 25 | 0.56 | 901 | 308 | 549 | 4,562 | 6,319 |

TABLE 5-continued

Theoretical results of possible precipitates in the mixture of Solution 1 with Solution 2 in different ratios by applying formulas

| Composition | Temp (°C.) | I.E. | Theoretical CaSO4 (mg/L) | Theoretical CaCO3 (mg/L) | Theoretical Fe2O3 (mg/L) | Theoretical CaCO3 by Ca(HCO3)2 (mg/L) | Pp (mg/L) |
|---|---|---|---|---|---|---|---|
| 90% Sol1 + 10% Sol2 | 25 | 0.10 | 401 | 159 | 266 | 2,794 | 3,621 |

TABLE 6

Experimental results of possible precipitates in the mixture of Solution 1 with Solution 2 in different ratios obtained by laboratory analysis

| Composition | Temp (°C.) | Experimental CaSO4 (mg/L) | Experimental CaCO3 (mg/L) | Experimental Fe2O3 (mg/L) | Pp (mg/L) |
|---|---|---|---|---|---|
| 10% Sol1 + 90% Sol2 | 25 | 2,980 | 12,800 | 2,010 | 17,790 |
| 25% Sol1 + 75% Sol2 | 25 | 2,321 | 10,500 | 1,510 | 14,331 |
| 50% Sol1 + 50% Sol2 | 25 | 1,700 | 7,700 | 1,100 | 10,500 |
| 75% Sol1 + 25% Sol2 | 25 | 914 | 4,400 | 510 | 5,824 |
| 90% Sol1 + 10% Sol2 | 25 | 389 | 2,820 | 239 | 3,448 |

2 in different ratios obtained by laboratory analysis

TABLE 7

Experimental results of possible precipitates in the mixture of Solution 1 with Solution 2 in different ratios by applying 1000 ppm of Formula 1

| Composition | Temp (°C.) | Experimental CaSO4 (mg/L) | Experimental CaCO3 (mg/L) | Experimental Fe2O3 (mg/L) | Pp (mg/L) |
|---|---|---|---|---|---|
| 10% Sol1 + 90% Sol2 + 1000 ppm F1 | 25 | <10 | ,2 | 69 | 71 |
| 25% Sol1 + 75% Sol2 + 1000 ppm F1 | 25 | <10 | <2 | 48 | 49 |
| 50% Sol1 + 50% Sol2 + 1000 ppm F1 | 25 | <10 | <2 | 30 | 30 |
| 75% Sol1 + 25% Sol2 + 1000 ppm F1 | 25 | <10 | <2 | <5 | <10 |
| 90% Sol1 + 10% Sol2 + 1000 ppm F1 | 25 | <10 | <2 | <5 | <10 |

Formulation 2.

Formulation 2 was prepared as shown in Table 8 by using components from Table 1.

TABLE 8

Formulation 2, inhibitor of barium sulfate formation

| Formulation 2 | 4% CITRIC ACID |
| | 10% ZINC ACETATE |
| | FORMIC ACID SOLUTION AT 30% |
| | 5% UROTROPINE |

A mixture of 1000 mg/L of barium sulfate in distilled water was prepared in the laboratory. Subsequently, 1000 ppm of Formulation 2 were added. A complete dissolution of precipitates was observed.

Formulation 3.

Ferric oxide was used in its pure state. 1 mg of ferric oxide was placed in 10 ml of water. When 1000 ppm of Formulation 1 was added, a complete dissolution of ferric oxide was observed. The same occurs by using Formulation 2.

During the experimental development of the above formulations, the following could be observed:

Precipitation process blocking

Modification of the shape (along with smaller size) and properties of the crystals obtained in Example 1.

Did not observe adherence of solids to the walls of the containers where the experiments were carried out.

The formulations proposed herein were mixed with crude at a 50:50 and 80:20 crude-treatment ratio for the other systems. No observation was made of a formation of undesirable emulsions or phases which are signs of incompatibility.

The corrosivity of a formulation was determined. The result is shown in Table 9.

TABLE 8

Corrosivity result for Formulation 1.

| Formulation | 30% FORMIC ACID + 4% CITRIC ACID + 10% ZINC ACETATE + 5% urotropine |
|---|---|
| COUPON No. | 2 |
| PIPE | 2⅞" |
| SYSTEM VOLUME USED | 100 ml |
| MEASUREMENTS COUPON (cm) | 0.85 × 2 × 6.5 |
| COUPON AREA (cm$^2$) | 29.75 |
| INITIAL WEIGHT (g) | 86.2259 |
| FINAL WEIGHT (g) | 85.6012 |
| WEIGHT LOSS (g) | 0.6247 |
| CORROSION (g/cm$^2$) | <0.03 |
| CORROSION (lb/ft$^2$) | <0.05 |

We claim:

1. A chemical composition for eliminating and inhibiting the formation of scaling in oil well pipes, said composition comprising:

an inorganic salt, wherein said inorganic salt is selected from the group consisting of calcium sulfate, barium sulfate, calcium carbonate, barium carbonate and ferric oxide and wherein said inorganic salt comprises between an amount greater than 0 and 12% by volume of total volume of said chemical composition;

a predetermined amount of an organic monocarboxylic acid, which is formic acid comprising about 30% by volume of said total volume;

a predetermined amount of an organic di or tricarboxylic acid which is citric acid comprising about 4% by volume of said total volume;

a predetermined amount of a salt derived from an organic carboxylic acid which is zinc acetate comprising about 10% by volume of said total volume;

a predetermined amount of a corrosion inhibitor which is urotropine comprising about 5% by volume of said total volume; and a predetermined amount of water which comprises the remainder of volume of said total volume.

* * * * *